United States Patent [19]

Sasaoka

[11] Patent Number: 4,736,251

[45] Date of Patent: Apr. 5, 1988

[54] COLOR IMAGE PICKUP APPARATUS HAVING ONE OR MORE LINE SENSORS AND A MECHANICAL SUB-SCANNING DEVICE

[75] Inventor: Takeshi Sasaoka, Kawasaki, Japan

[73] Assignee: Ikegami Tsushinki Co. Ltd., Tokyo, Japan

[21] Appl. No.: 922,838

[22] Filed: Oct. 21, 1986

Related U.S. Application Data

[63] Continuation of Ser. No. 559,768, Dec. 9, 1983, abandoned.

[30] Foreign Application Priority Data

Dec. 15, 1982 [JP] Japan .................. 57-219673

[51] Int. Cl.[4] .................. H04N 1/46; H04N 1/10
[52] U.S. Cl. .................. 358/75; 358/78; 358/293
[58] Field of Search .................. 358/75, 78, 293, 294

[56] References Cited

U.S. PATENT DOCUMENTS

| | | | |
|---|---|---|---|
| 3,962,681 | 6/1976 | Requa et al. | 358/293 |
| 4,331,979 | 5/1982 | Bendell | 358/209 |
| 4,413,276 | 11/1983 | Hertz et al. | 358/75 |
| 4,467,348 | 8/1984 | Fujii et al. | 358/78 |
| 4,523,235 | 6/1985 | Rajchman | 358/293 |
| 4,553,035 | 11/1985 | Malinsky et al. | 358/293 |
| 4,667,255 | 5/1987 | Lindberg | 358/293 |

FOREIGN PATENT DOCUMENTS

| | | | |
|---|---|---|---|
| 0043721 | 1/1982 | European Pat. Off. | 358/78 |
| 145413 | 12/1978 | Japan | 358/294 |
| 126416 | 10/1979 | Japan | 358/75 |
| 154346 | 12/1979 | Japan | 358/75 |
| 58-370 | 5/1981 | Japan | 358/75 |
| WO81/00944 | 4/1981 | PCT Int'l Appl. | 358/293 |

OTHER PUBLICATIONS

Fairchild Data Sheet CCD133/143.

Primary Examiner—James J. Groody
Assistant Examiner—Randall S. Svihla
Attorney, Agent, or Firm—Spencer & Frank

[57] ABSTRACT

A color image pickup apparatus has one line sensor which sequentially reads a document through different color filters to generate different color signals. Either the line sensor or the document is mechanically moved in a sub-scanning direction by a mechanical device. A rotary encoder coupled to the mechanical device generates pickup pulses which drive the line sensor each time the line sensor or document is moved a predetermined distance. In an alternate embodiment, two or more line sensors having different color filters each read a different line on the document to generate different color signals having shifted timings. Frame memories, shift registers, memories with a capacity of a plurality of lines, or buffer registers may be used to correct for the shifted timings of the color signals.

9 Claims, 12 Drawing Sheets

FIG.2A
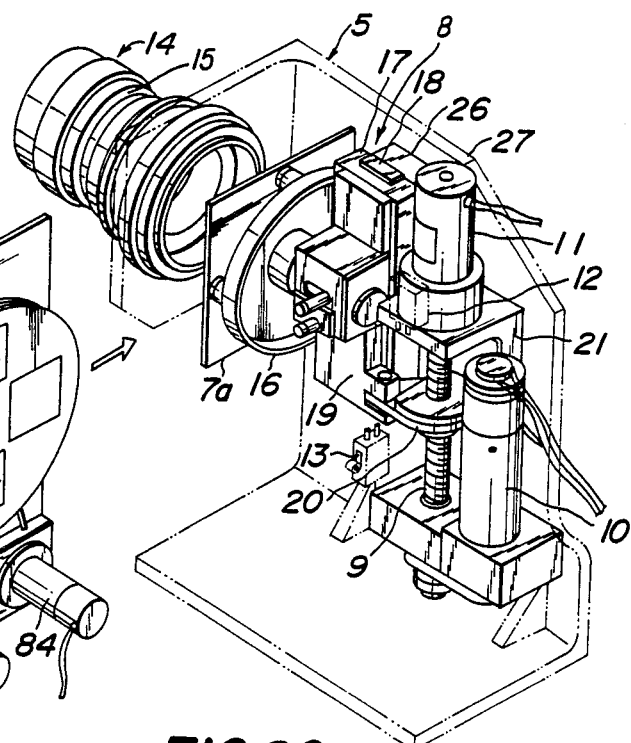
FIG.2B
FIG.2C
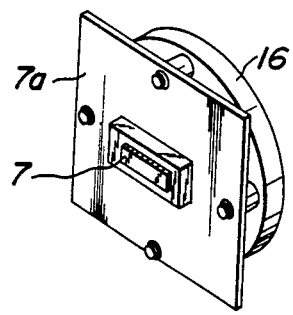

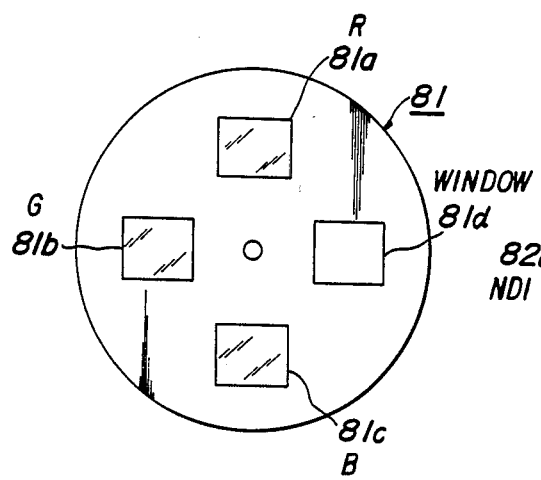
FIG.3A
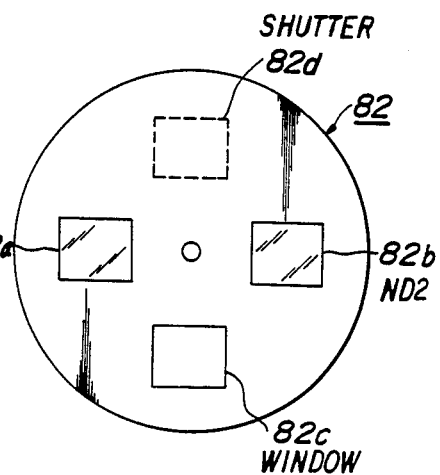
FIG.3B
FIG.4A
FIG.4B
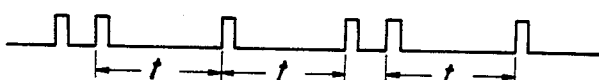
FIG.4C
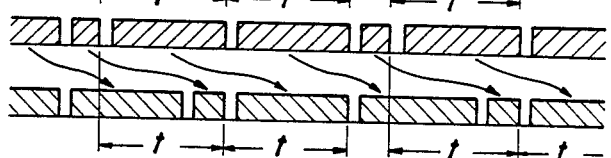
FIG.4D
FIG.4E
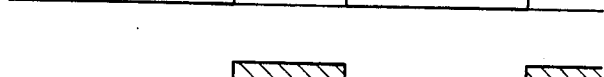
FIG.4F
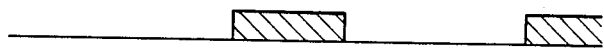

FIG_8

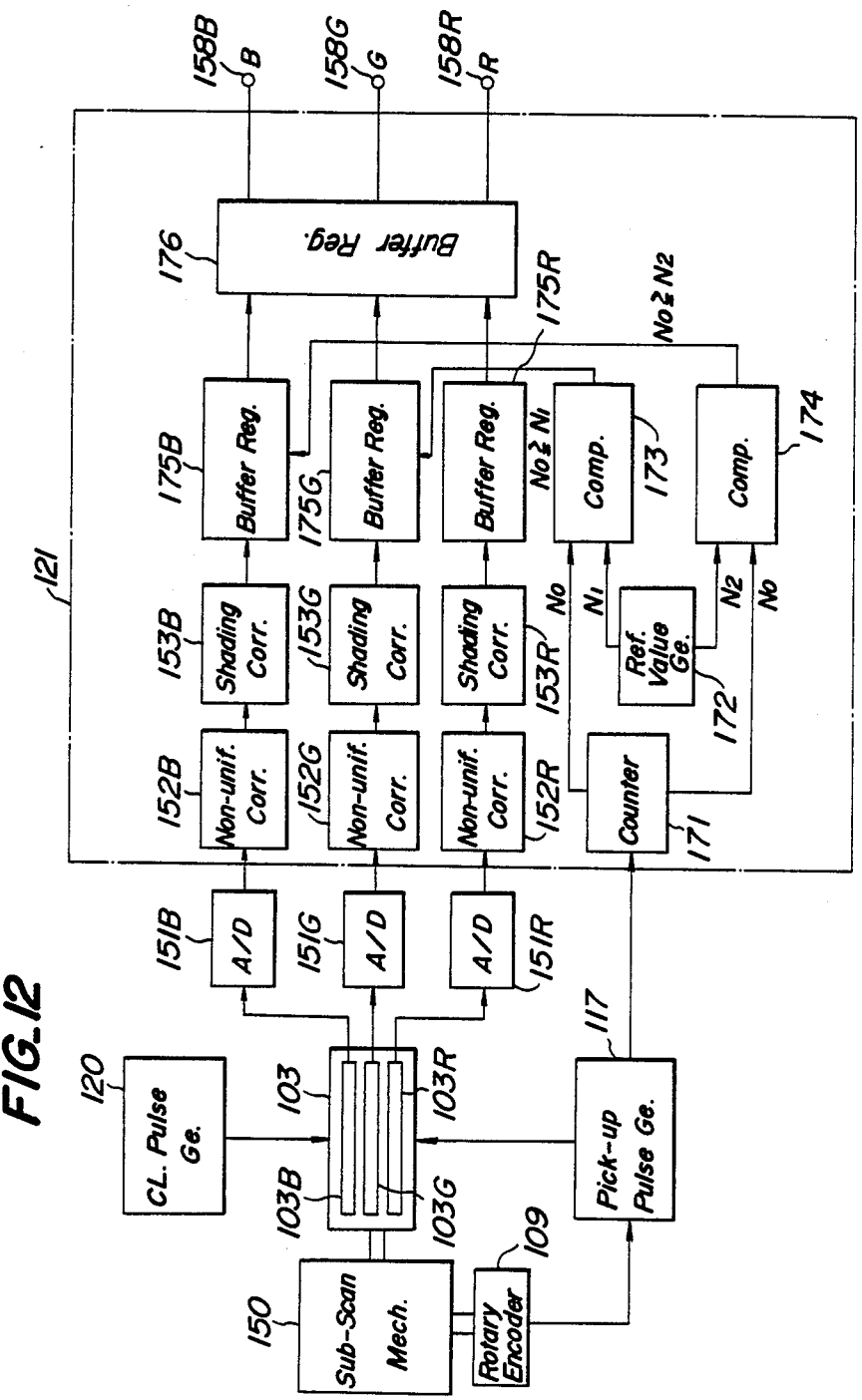

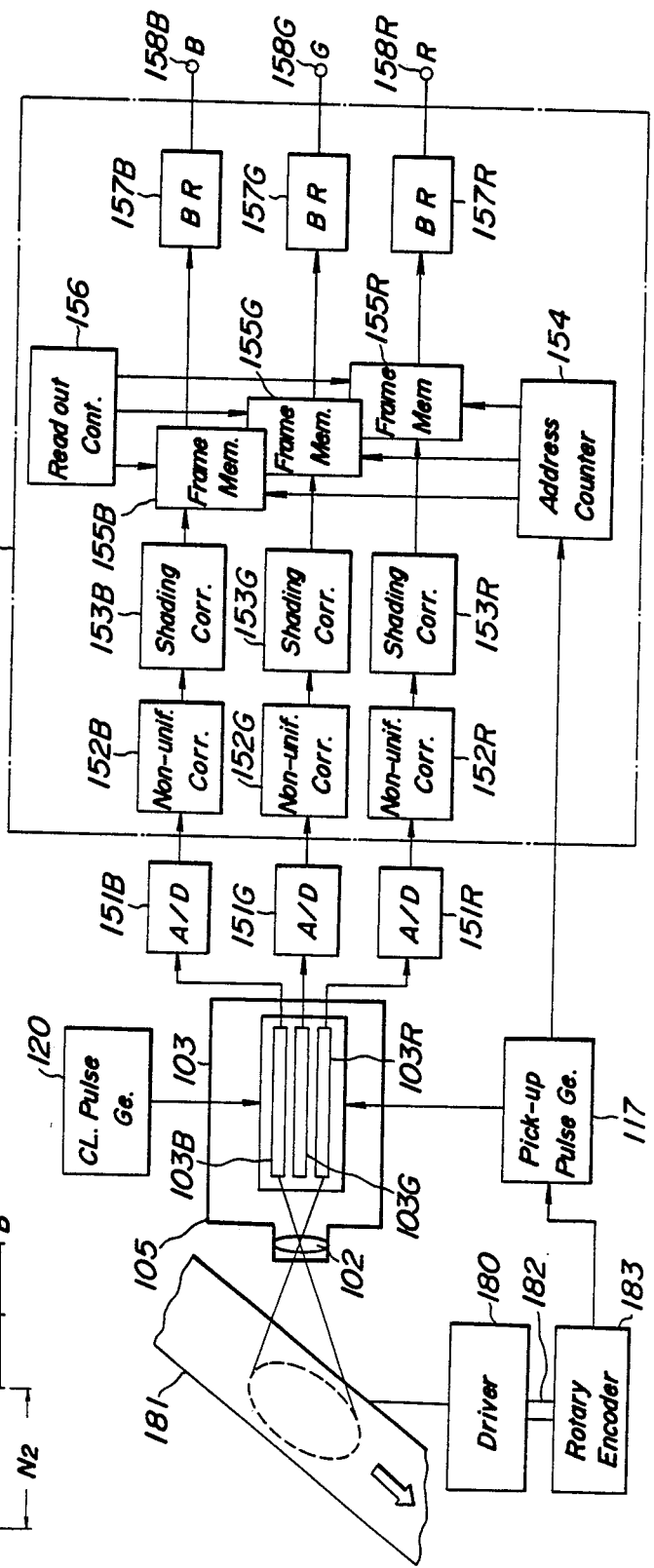

COLOR IMAGE PICKUP APPARATUS HAVING ONE OR MORE LINE SENSORS AND A MECHANICAL SUB-SCANNING DEVICE

This application is a continuation of application Ser. No. 559,768, filed Dec. 9, 1983, now abandoned.

BACKGROUND OF THE INVENTION

The present invention relates to a two dimensional color pick-up apparatus comprising a solid state image sensor.

Such a color pick-up apparatus is used to pick-up a transparent or opaque color document to generate red (R), green (G) and blue (B) color signals or an NTSC color television signal. In case of generating the NTSC color television signal, use has been made of a color television camera or a flying spot scanner (FSS). In CCTV (closed circuit television) and various kinds of image processing apparatuses, the three primary color signals are sometimes used. In accordance with recent progress in the color image processing art, it has been earnestly desired to develop a color pick-up apparatus which can generate R, G and B color signals having high resolution and S/N.

Heretofore, in order to derive the R, G and B color signals, the illuminated color document is picked up by a color television camera. However, the number of scanning lines per frame of the color television camera is limited to 525 or 625 lines and thus fine patterns, figures and characters could not be picked up accurately. Further, it is very difficult to remove so-called shading due to an optical system including an objective lens and an illumination system. In another method for deriving the R, G and B color signals, a standard FSS apparatus is used to pick up the color document. This apparatus has the drawbacks that the size of the document is limited and the whole apparatus is liable to be large due to a large FSS tube. It is possible to construct the FSS apparatus so as to pick up documents having an arbitrary size. However, since flare due to multiple reflection within a screen plate of the FSS tube could not be eliminated completely, its resolution might be limited. Moreover, the shading due to the optical system and illumination system could not be deleted and further the raster distortion could be hardly eliminated.

Ther has been further proposed an electronic camera comprising a CCD two dimensional image sensor and a magnetic disc memory. However, the number of picture elements of the CCD two dimensional image sensor is limited only to a small value and thus, the resolution of the reproduced image is low.

SUMMARY OF THE INVENTION

The present invention has for its object to provide a two dimensional color pick-up apparatus which can obviate the above drawbacks of the known apparatuses of various types and can produce color signals having high resolution and high S/N without being subjected to distortion and flare.

It is another object of the invention to provide a two dimensional color pick-up apparatus which can generate color image signals of good image quality, while non-uniformity of image sensing elements of a solid state image sensor and shading due to the optical system and illumination system can be corrected sufficiently.

It is still another obejct of the invention to provide a two dimensional color pick-up apparatus in which a correct exposure amount can be always attained by automatically adjusting a lens focus, an iris and the intensity of a light source.

It is still another object of the invention to provide a two dimensional color pick-up apparatus in which desired color picture signals can be derived within a short time period.

According to the invention, a two dimensional color pick-up apparatus comprises a camera head means including an optical means for forming an image of an object to be picked up on an imaging plane, a solid state image sensing means having at least one line sensor which is arranged in said imaging plane and has a number of image sensing elements arranged side by side in a main scanning direction with a given pitch, and a color filter means including at least one color filter arranged between said optical means and the solid state image sensing means;

a mechanical sub-scanning means for causing a relative movement of said object and said camera head means in a sub-scanning direction perpendicular to said main scanning direction to effect a sub-scanning;

a pick-up pulse generating means coupled with said mechanical sub-scanning means for producing pick-up pulses every time said object and camera head means are relatively moved by a distance corresponding to said given pitch;

a controlling means for controlling said line sensor to initiate a line scanning in said main scanning direction in response to said pick-up pulses; and a signal processing means for processing an output image signal from said line sensor to produce a desired color image signal.

BRIEF DESCRIPTION OF THE DRAWINGS

FIGS. 2A 2B and 2C are perspective views depicting the detailed construction of a camera head of the apparatus shown in FIG. 1;

FIGS. 3A and 3B are plan views illustrating a filter means of the apparatus depicted in FIG. 1;

FIGS. 4A to 4F are waveforms for explaining the operation of a line sensor of the apparatus shown in FIG. 1;

FIG. 12 is a block diagram showing still another embodiment of the signal processing circuit;

FIG. 13 is a schematic view for explaining the operation of the circuit shown in FIG. 12;

FIG. 14 is a schematic view showing still another embodiment of the color pick-up apparatus according to the invention;

DESCRIPTION OF THE PREFERRED EMBODIMENTS

Figure 1:
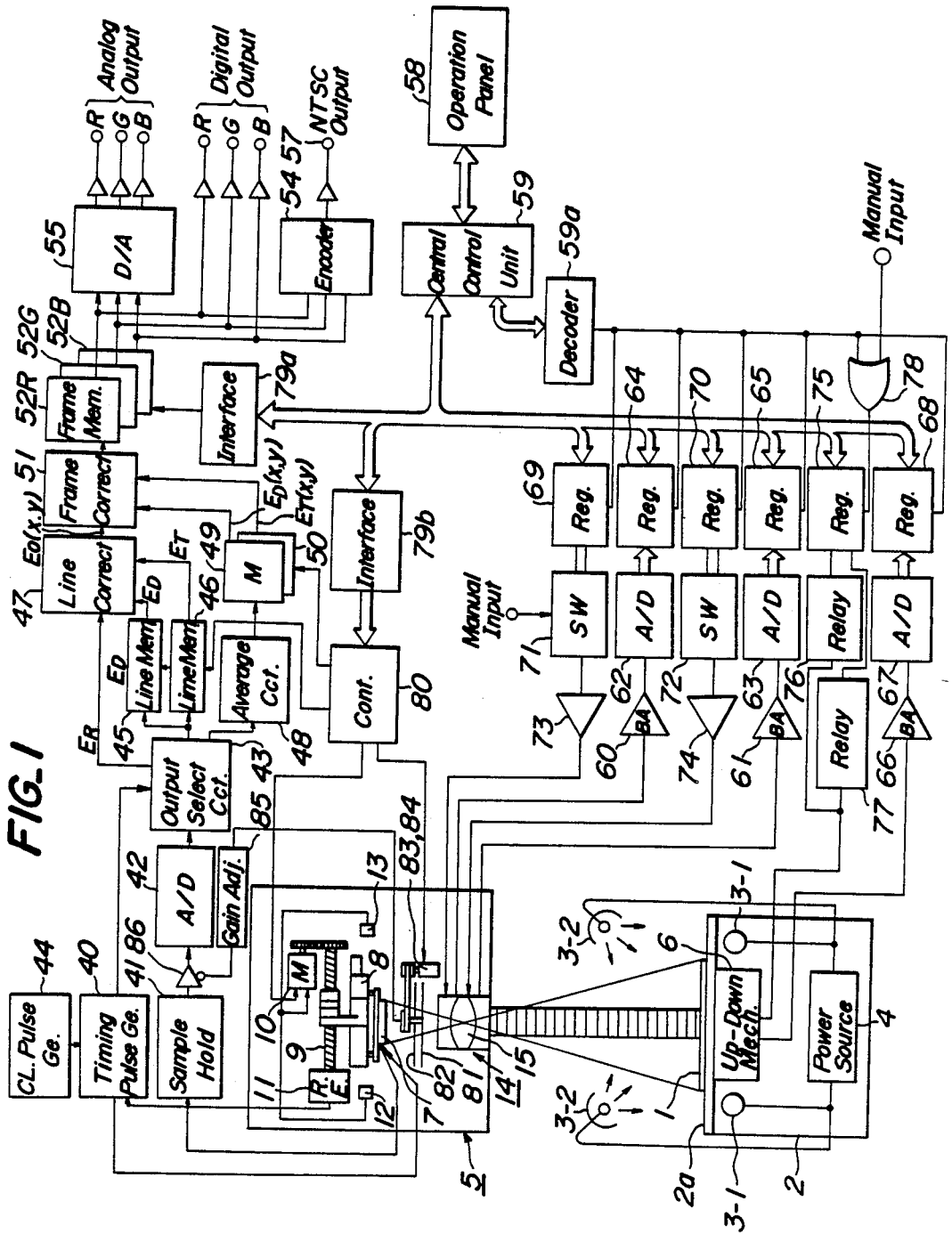
FIG. 1 is a schematic view showing the whole construction of an embodiment of the color pick-up apparatus according to the invention.

FIG. 1 is a schematic view showing the whole construction of an embodiment of the two dimensional color pick-up apparatus according to the invention. A color document 1 to be picked up is placed on a transparent glass template 2a of a document table 2. Inside the document table 2 are arranged first illumination lamps 3-1, such as halogen lamps for illuminating a transparent document, and a power supply source 4 for the illumination lamps. Above the document table 2 are arranged second illumination lamps 3-2 for illuminating an opaque document and a camera head 5 including an optical system, a semiconductor solid state image sensor and a driving mechanism therefor. The distance between the document table 2 and the camera head 5 can be adjusted by means of an up-down mechanism 6 provided in the document table 2. In the present embodiment, the semiconductor solid state image sensor comprises a CCD line sensor 7 which is secured to a ball slide unit 8. The ball slide unit 8 can be arranged movably along a ball screw 9 which is rotated by a motor via gears. In order to detect the rotation angle of the ball screw 9, i.e. the movement of the CCD line sensor 7 in a sub-scanning direction, a rotary encoder 11 is secured to the ball screw 9. Further, in order to detect the movement of the CCD line sensor 7 up to extreme positions, there are provided limit switches 12 and 13. By means of such a mechanism, the line sensor 7 can be moved in the sub-scanning direction precisely. In the camera head 5 there is provided an optical system 14 including an objective lens 15, an automatic exposure mechanism and an automatic focus mechanism. Between the CCD line sensor 7 and the optical system 14 are arranged two filters 81 and 82 which can be driven with respect to the optical path by means of motors 83 and 84.

FIGS. 2A, 2B and 2C are perspective views illustrating the construction of the camera head 5 shown in FIG. 1. In the focus plane of the objective lens 15 is placed the CCD line sensor 7 which is secured on a printed circuit board 7a as shown in FIG. 2C. It is apparent that the CCD line sensor 7 may be replaced by a BBD line sensor or other type solid state line sensors. In the present embodiment, the CCD line sensor 7 comprises 1648 image sensing elements and has a length of about 22 mm. Therefore, one image sensing element has a dimension of about 13 μm. The printed circuit board 7a supporting the CCD line sensor 7 is fixed to a slide table 17 via a connecting plate 16 and the slide table 17 is moved up and down by means of a linear slide mechanism. The linear slide mechanism couples the slider 18 and the slide table 17 with each other without play via a plurality of balls and the deviation in a direction perpendicular to the slide direction can be limited to at most 3 μm. As illustrated in FIG. 2A, the inner slider 18 of the linear slide mechanism is secured to a frame 27 by means of a fitting member 26 in parallel with the image plane perpendicular to the optical axis of optical system 14 and in a direction parallel to the elongated direction (horizontal direction) of the CCD line sensor 7. In this manner, the CCD line sensor 7 can be moved linearly in the sub-scanning direction, while the deviation of the sensor in the optical axis direction as well as the main scanning direction can be limited to at most 3 μm. This amount of the deviation can be ignored if compared with the dimension of the single image sensor element of 13 μm. Further, since the depth of focus of the objective lens 15 is about 30 μm, de-focusing does not occur.

To the slide table 17 of the linear slide mechanism is secured a member 19 to which is secured a ball nut 20 engaging with the ball screw 9. The ball screw 9 serves to convert the rotational movement into linear movement with a high accuracy by inserting balls between a lead screw and the nut without play. If required, it is possible to manufacture a ball screw having such a high accuracy that an error of 10 μm per a stroke of 1 m can be attained. Further as compared with a usual screw having slide friction between male and female members, a ball screw has rotational friction and thus the ball screw can be rotated by a smaller force, and its life time is very long. Therefore, the ball screw can be operated accurately for a very long time, such as 15,000 to 20,000 hours. The ball screw 9 is supported by the frame 27 by means of a member 21 and is rotated by the small motor 10.

In order to prevent the slide table 17, i.e. the CCD line sensor 7, from being moved excessively, a pair of limit switches 12 and 13 are provided and when the limit switches are actuated, the motor 10 is stopped. To one end of the lead screw of the ball screw 9 is secured the rotary encoder 11, which detects the rotational movement of the ball screw 9 to produce a pick-up pulse each time the ball screw 9 is rotated by a predetermined angle. The pick-up pulse thus generated is used to control the scanning of the CCD line sensor 7 in the main scanning direction.

In the camera head 5 having the above mentioned construction, the CCD line sensor 7 is moved linearly in the sub-scanning direction, while the deviation in the main scanning direction perpendicular to the linear movement is limited to at most 3 μm and, therefore, the left hand edge of the frame scanned by the CCD line sensor 7 is considered to be a straight line. Further, since the deviation of the line sensor 7 in the optical axis direction can be also limited to at most 3 μm, the image projected on the line sensor 7 is not de-focussed during the scanning. Moreover, the pick-up pulses from the rotary encoder 11 are accurately related to the linear movement of the line sensor 7 in the sub-scanning direction regardless to the variation of the rotational speed of the motor 10. Therefore, by effecting the reading out operation of the CCD line sensor 7 under the control of the pick-up pulses, distances between successive scanning lines can be maintained constant. When the above mentioned deviations of 3 μm are compared with the actual length of the CCD line sensor 7 of 22 mm and the sub-scanning length of 40 mm, errors are about 0.0136% and 0.0075%, respectively, and can be ignored. In this manner, according to the invention, undistorted scanning can be achieved.

In the above linear slide mechanism, the rotation of the ball screw 9 is precisely converted into linear movement of the ball nut 20, and the distance between successive scanning lines can be made small by controlling the reading-out of the CCD line sensor 7 in synchronism with the pick-up pulses from the rotary encoder 11. For instance, the spacing between successive scanning lines can be made equal to the pitch between successive image sensing elements of the CCD line sensor 7, i.e. 13 μm. In this case, when horizontal and vertical lengths of the image raster are denoted as a and b, respectively, the number of scanning lines can be determined by multiplying the number of the image sensing elements of the CCD line sensor 7 by b/a, i.e., the aspect ratio of the image raster. Further, the length of the sub-scanning can be obtained by multiplying the number of the scanning lines by the distance between successive scanning lines. It should be noted that when it is not necessary to make the distance between successive scanning lines equal to the pitch of the image sensing elements, the number of scanning lines can be calculated by dividing the longitudinal length of the frame by the distance between successive scanning lines.

As depicted in FIG. 2B, a rotary filter device includes the two filter discs 81 and 82. The rotary filter device is arranged between the lens 15 (see FIG. 2A) and line sensor 7 (see FIG. 2C) and is driven by motors 83 and 84, respectively, under the control of a controller 80 as shown in FIG. 1. As illustrated in FIG. 3A, the first filter disc 81 includes R, G and B color filters 81a, 81b and 81c and a window 81d, and as illustrated in FIG. 3B the second filter disc 82 comprises two ND filters 82a and 82b having different transmittivities and a window 82c. The portion of the filter disc 82 denoted by broken line 82d (FIG. 3B) acts as a shutter. By combining the first and second filter discs 81 and 82 suitably, it is possible to obtain desired filter characteristics and shutter function.

The ND filters 82a and 82b serve to attenuate uniformly the strength of the incident light upon the CCD line sensor and thus are used to adjust or lower the sensitivity of the image pick-up apparatus. When the shutter portion 82d is inserted in the optical path, the incident light is prevented from being made incident upon the CCD line sensor. When the image pick-up apparatus is not used, the shutter portion 82d is inserted in the optical path, so that the CCD line sensor is protected against damage due to strong light. Further, the shutter portion 82d is placed in the optical path when the dark current levels are derived as will be explained later.

As shown in FIG. 1, the CCD line sensor 7 receives transferring clock pulses and a photoelectric conversion initiating signal from a timing pulse generator 40 and an output signal from the line sensor 7 is supplied via a sample and hold circuit 41 and A/D converter 42 to an output select circuit 43. The timing pulse generator 40 receives the pick-up pulses from the rotary encoder 11 and clock pulses from a clock pulse generator 44 and supplies the clock pulses and photoelectric conversion initiating signal to the output select circuit 43. In ordinary applications, the CCD line sensor 7 is self-scanned at a rate slow enough to permit a high signal-to-noise ratio to be attained. However, in case the main scanning is effected by self-scanning the linear image sensor and the sub-scanning is carried out by moving the image sensor, it is difficult to attain synchronization precisely. If the motor 10 is a stepping motor which is driven by driving pulses having the self-scanning frequency, it is difficult to make the phases of the signals of successive lines identical with each other. Moreover, if use is made of a DC motor, the speed might be varried in dependence upon the variation of the power supply voltage, and thus synchronization could not be realized. Further, the speed of the mechanical movement is influenced by variations in frictional force and shock and the speed of the sub-scanning might be changed instantaneously due to the instantaneous unevenness in the rotation speed due to vibration.

In order to solve the above problem, in the present embodiment, the start points of successive scanning lines are determined by the pick-up pulses from the rotary encoder 11 coupled with the ball screw 9 and the CCD line sensor 7 is cleared and set by a given pick-up pulse to start the photocarrier accumulation. In this manner, even if the motor 10 is subjected to variation in speed, each time the line sensor 7 is moved in the sub-scanning direction by the predetermined distance, a pick-up pulse is generated to start the photocarrier accumulation. Therefore, synchronization can be always attained accurately and correct scanning can be effected.

FIGS. 4A to 4F shows waveforms for explaining the operation of the CCD line sensor 7 and the pick-up pulses. FIG. 4A shows the pick-up pulses supplied from the rotary encoder 11 and FIG. 4B illustrates the photoelectric conversion initiating signals which contains a first kind of pulses generated in synchronism with the pick-up pulses, and a second kind of pulses having a period of t corresponding to a self-running period of the CCD line sensor. As shown in FIG. 4c, in response to a rising edge of the initiating signal, the charges accumulated in the image sensing elements of the CCD line sensor 7 are cleared and transferred to a transfer section and in response to a trailing edge of the initiating pulse, the photoelectric conversion is started again. As illustrated in FIG. 4D, the charges transferred into the transfer section, which is composed of a kind of shift register, are transported by two or three phase transport clocks to derive an output image signal. The output image signal thus read out is sampled and held in the sample and hold circuit 41 and is converted into an 8 bit digital signal by the A/D converter 42 via an amplifier 86. In order to compensate the level variation of the image signal due to the spectrum characteristics of the CCD line sensor 7, a signal from a gain setting circuit 85 is supplied to the amplifier 86 as the control signal in relation to the filter information detected by a position detector provided in the color filter driving mechanism. In response to the switching of the filters, the gain of the amplifier 86 is so adjusted that the amplitudes of the three color image signals become equal to each other. In should be noted that the amplifier 86 may be directly controlled by the controller 80.

In order to derive only the output signal related to information at the initiation of the charge accumulation in response to the initiating signal shown in FIG. 4B synchronized with the pick-up pulse illustrated in FIG. 4A, the timing pulse generator 40 generates a gate pulse shown in FIG. 4E after the one period t from the pick-up pulse and the gate pulse is supplied to the output select circuit 43. Then, the output select circuit 43 conducts the output from the A/D converter 42, while the gate pulse is supplied so as to derive the output image signal from the A/D converter 42 as shown in FIG. 4F.

In the above explanation, the period of the pick-up pulse is made longer than two self-scanning periods, but it is also possible to increase the speed of sub-scanning and to shorten the period t of the pick-up pulses. When the periods of the pick-up pulse and the self-scanning are made identical with each other, it will be possible to derive the charges continuously.

The optical system 14 in the camera head 5 has so-called shading and the central portion of the projected image becomes bright, but the peripheral portion becomes dark. Further, the linear image sensor 7 has a so-called non-uniformity due to unevenness in dark currents of respective image sensing elements of the linear image sensor 7.

In order to compensate the above mentioned non-uniformity of the CCD line sensor 7, there are provided first and second line memories 45 and 46 which store outputs $E_D$ and $E_T$ of a scanning line at a given position within the sub-scanning range, wherein $E_D$ is a dark current level and $E_T$ is the output level of standard light which is not modulated, i.e. white level.

The output image signal $E_R$ in case of picking up a color document is supplied to a line correction circuit 47 together with the signals $E_D$ and $E_T$ read out of the memories 45 and 46. In the line correction circuit 47, a corrected image signal $E_{74}$ is calculated by the following equation (1).

$$E_\theta = \frac{E_R - E_D}{E_T - E_D} \quad (1)$$

This calculation is carried out for respective picture elements and the non-uniformity of the line sensor 7 can be corrected accurately.

In order to further correct the shading and flare due to the optical system and light source, the image signal of one frame is supplied to an averaging circuit 48 via the output select circuit 43. In the averaging circuit 48, average values $\overline{E_D}(x, y)$ and $\overline{E_T}(x, y)$ of signals $\overline{E_D}(x, y)$ and $\overline{E_T}(x, y)$ supplied from 16×16 picture cells within a small area are calculated. The thus calculated average values $\overline{E_D}(x, y)$ and $\overline{E_T}(x, y)$ are stored in two dimensional memories 49 and 50. The average values $\overline{E_D}(x, y)$ and $\overline{E_T}(x, y)$ are supplied to a frame correction circuit 51 together with the signal $E_{74}(x, y)$ from the line correction circuit 47 and the correction is effected in accordance with the following equation (2) to produce a completely corrected image signal $E(x, y)$.

$$E(x, y) = \frac{E_\theta(x, y) - \overline{E_D}(x, y)}{\overline{E_T}(x, y) - \overline{E_D}(x, y)} \quad (2)$$

The R, G and B color image signals thus corrected are stored in frame memories 52R, 52G and 52B, respectively.

In order to pick-up color documents having various sizes, the magnification of the imaging lens 15 can be changed between 1 and 5 with graduations of 0.01 by operating a suitable adjusting member provided on an operational panel 58. The adjusted magnification can be displayed on the operation panel 58. After setting the magnification, when a start button on the panel 58 is pushed, the positions of the camera head 5, lens 15 and iris are automatically set into values which have been previously calculated. To this end, signals representing the positions of the iris and the lens are supplied via buffer amplifiers 60 and 61, A/D converters 62 and 63 and registers 64 and 65 to a central control unit 59. Further, a signal representing the position of the camera head 5 is supplied from the up-down mechanism 6 to the central control unit 59 via buffer amplifier 66, A/D converter 67 and register 68. These information signals are compared with given preset values and if they deviate from the preset values, there are produced signals for driving the various elements so as to remove the deviation. That is to say, the iris driving signal and lens driving signal are supplied to the optical system 14 by means of decoder 59a, registers 69 and 70, switches 71 and 72 and amplifiers 73 and 74. In this manner, the lens and iris in the optical system 14 can be set in position. Further, the information signal for positioning the camera head 5 is supplied to an AC motor in the up-down mechanism 6 via decoder 59a, register 75 and solid state relays 76 and 77. The iris position and camera head position can be also set manually. For this purpose, an iris manual control signal may be supplied to the switch 71 and a signal for driving the camera head manually is supplied to the register 75 by means of an OR gate 78. These manual control signals may be generated by driving manual switches provided on the panel 58. The adjustment of the iris can be effected by rotating an iris ring by means of a reversal motor. Further, the lens position may be adjusted by driving a helicoid or cam mechanism with the aid of a reversal motor. These adjusting mechanisms are well-known in the art and thus will not be explained further.

The central control unit 59 controls writing-in and reading-out operations of the frame memories 52R, 52G and 52B via an interface 79a and sends a command to the controller 80 by means of an interface 79b to control the motors 10, 83 and 84, line memories 45, 46 and frame memories 49, 50.

The R, G and B color image signals stored in the frame memories 52R, 52G and 52B are supplied as digital R, G and B outputs, analog R, G and B outputs via a D/A converter 55 or NTSC output through an encoder 54. It is possible to arrange a color monitor for displaying a color image by means of the analog color signals from the D/A converter 55. In such a case, it is possible to effect the adjustment of the portions of the camera head 5, lens 15 and iris and the position of the document on the table in an easy and accurate manner by viewing the color image displayed on the monitor.

As explained above in detail, in the present embodiment, it is possible to obtain a color image signal having a high resolution and S/N and being entirely free from flare, non-uniformity and shading, and therefore the pick-up apparatus can be advantageously used in various applications in which fine patterns and small characters have to be picked-up, printings in which very high resolution is required and measurements in which a high quality television picture is necessary.

Figure 5A:
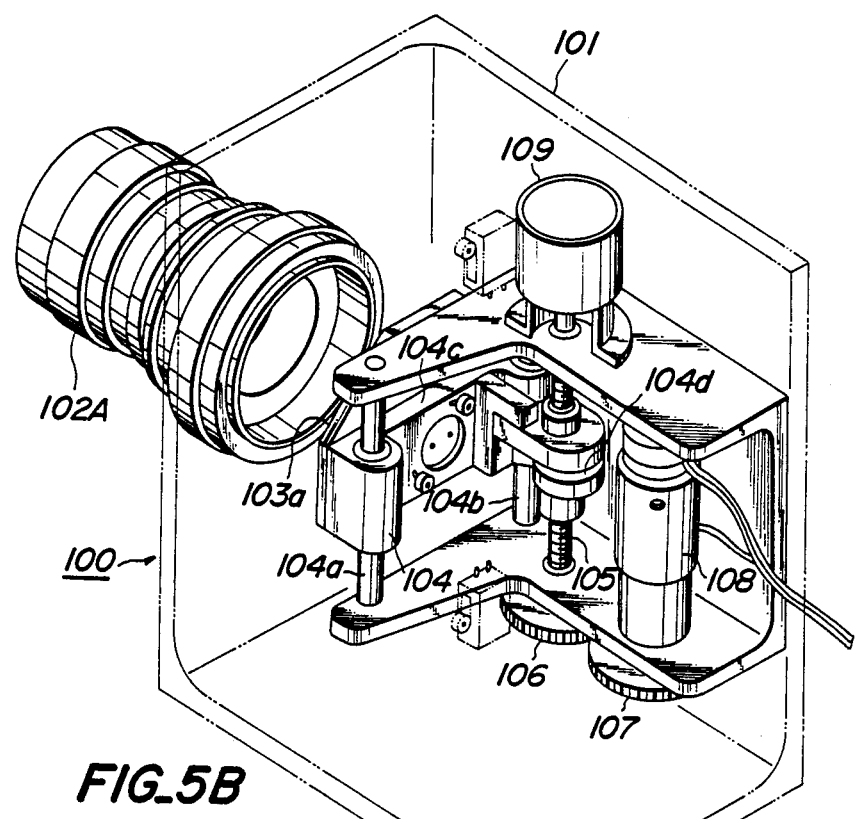
FIGS. 5A and 5B are perspective views showing another embodiment of the camera head according to the invention.
Figure 5B:
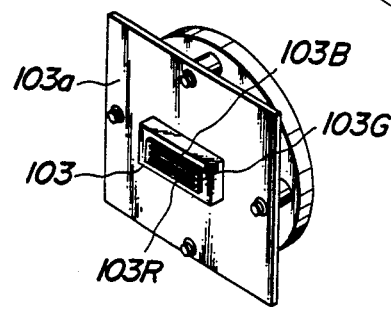

FIGS. 5A and 5B show a camera head of another embodiment of the two dimensional color pick-up apparatus according to the invention. In the present embodiment, the camera head 100 comprises a casing 101 to which an optical system 102A is fixed. As shown in FIG. 5B, a solid state image sensor 103 comprising three CCD line sensors 103R, 103G and 103B arranged in parallel with each other is secured to a printed circuit board 103a which is then fixed to a linear shaft unit 104. On front surfaces of the line sensors 103R, 103G and 103B are provided red, green and blue color filters (not shown), respectively. Each of the CCD line sensors 103R, 103G and 103B includes 2048 image sensing elements arranged side by side and has a length of 27 mm. The width of a unit image sensing element is about 13 $\mu$m and thus, the pitch is equal to 13 $\mu$m.

The linear shaft unit 104 comprises a pair of linear ball bearing members 104a and 104b which are engaged with a pair of linear shafts, respectively and a bridging member 104c connected across the bearing members. Also in this embodiment, the image sensor 103 can be linearly moved along the shafts at a very high precision and the deviation in the main scanning direction can be limited to at most 3 μm. Further, the depth of focus of the optical system 102A is about 30 μm, and thus the image projected on the image sensor 103 is not defocussed and has a high resolution. The bridging member 104c is coupled with a ball screw 105 via a ball nut 104d and the ball screw 105 is rotated by a motor 108 via gears 106 and 107. To the ball screw 105 is connected a rotary encoder 109 which produces a pick-up pulse for controlling the scanning of the line sensors 103R, 103G and 103B. Also in this embodiment, since the scanning of the line sensors 103R, 103G and 103B is controlled in relation to the actual movement of the sensors in the sub-scanning direction, the distance between successive scanning lines can be kept constant. Therefore, the distance between successive scanning lines can be made extremely small and thus very high resolution can be attained.

Figure 6:
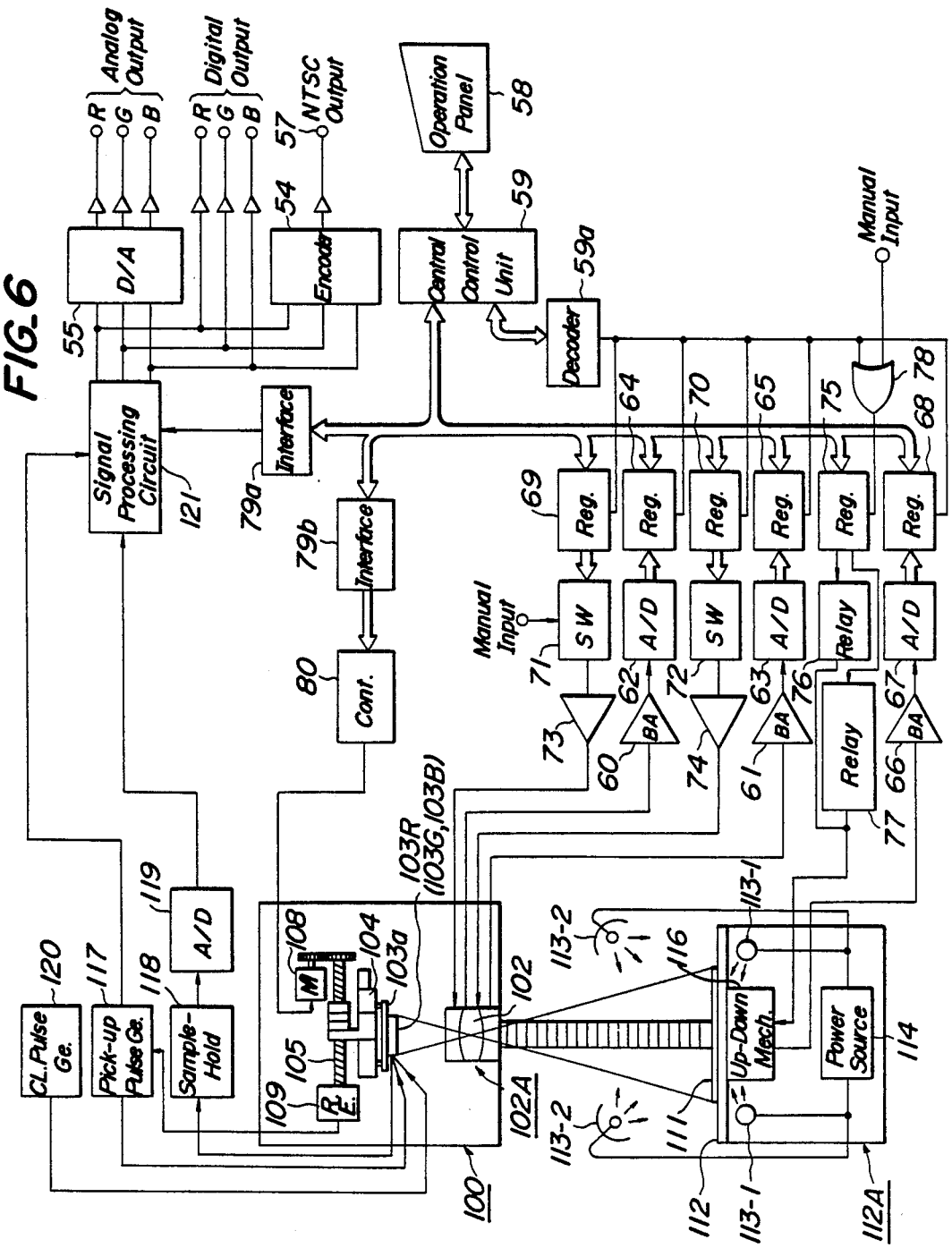
FIG. 6 is a schematic view illustrating the whole construction of another embodiment of the color pick-up apparatus comprising the camera head shown in FIGS. 5A and 5B.

FIG. 6 is a schematic view showing the whole construction of a two dimensional color pick-up apparatus comprising the camera head 100 shown in FIGS. 5A and 5B. A color document 111 to be picked up is placed on a transparent glass template 112 of a document table 112A which comprises illumination lamps 113-1 and 113-2, a power supply source 114 and a mechanism 116 for moving the camera head 100 up and down.

Each of the CCD line sensors 103R, 103G and 103B of the image sensor 103 receives clock pulses and a photoelectric conversion initiating signal from a pick-up pulse generator 117 to which clock pulses and timing pulses generated by a clock pulse generator 120 and the rotary encoder 109, respectively, are supplied. Red, green and blue color signals from the line sensors 103R, 103G and 103B are supplied to a signal processing circuit 121 via sample and hold circuit 118 and A/D converting circuit 119. Under the conrol of the pick-up pulses serving as the photoelectric conversion initiating signal and the clock pulses, each of the line sensors 103R, 103G and 103B is operated in a similar manner to that explained above with reference to FIGS. 4A to 4F.

The remaining construction of the pick-up apparatus according to this embodiment is similar to that of the previous embodiment and thus its explanation is omitted; portions similar to those of the previous embodiment are denoted by the same reference numerals.

The central control unit 59 controlls the signal processing circuit 121 by means of an interface 79a and the motor 108 in the camera head 100 via interface 79b and controller 80.

Color image signals from the signal processing circuit 121 may be derived as digital color image signals, analog color signals via a D/A converter 55, and an NTSC color television signal via an encoder 54. Also in this embodiment, the analog color image signals may be displayed on a color monitor.

Now several embodiments of the signal processing circuit 121 will be explained hereinbelow.

Figure 7:
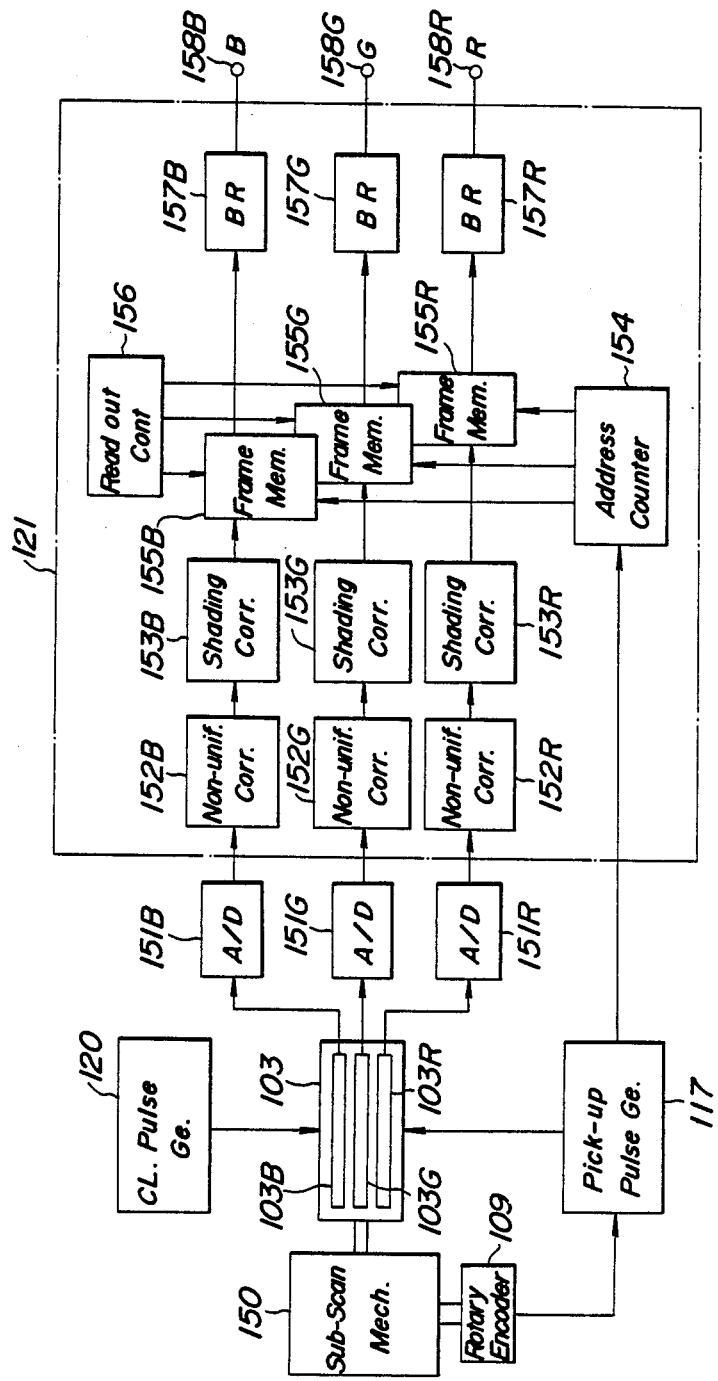
FIG. 7 is a block diagram showing a signal processing circuit of the apparatus illustrated in FIG. 6.

FIG. 7 shows a first embodiment of the signal processing circuit 121. In FIG. 7, a mechanical sub-scanning device 150 and the rotary encoder 109 are shown in a simplified manner. The three line sensors 103R, 103G and 103B of the solid state image sensor 103 are controlled by the pick-up pulse generator 117 and clock pulse generator 120 and three primary color signals supplied from the line sensors 103R, 103G and 103B are sampled and converted into digital signals by A/D converters 151R, 151G and 151B, respectively.

The objective lens 102 provided in the optical system 102A has shading and the line sensors 103R, 103G and 103B have non-uniformity. The non-uniformity is corrected by non-uniformity correction circuits 152R, 152G and 152B in accordance with the equation (1). Then, shading is corrected by shading correction circuits 153R, 153G and 153B in accordance with the equation (2).

In the manner explained above, the red, green and blue color signals, whose shading and non-uniformity have been compensated for, can be obtained. It is apparent that these color signals are shifted in timing by amounts corresponding to the distances between the R, G and B line sensors 103R, 103G and 103B in the sub-scanning direction. The thus shifted color signals will be processed in the signal process circuit 121 in accordance with the receiver in which the color signals are utilized. In the embodiment illustrated in FIG. 7, the color signals are converted into continuous signals having identical timings in order to display a color image on a color monitor. To this end, there is provided an address counter 154 which counts the pick-up pulses generated by the pick-up pulse generator 117 in response to the pulses supplied from the rotary encoder 109. As explained above in relation to the previous embodiment, the pick-up pulses are generated at scanning start points on respective scanning lines. The color signals are supplied to frame memories 155R, 155G and 155B and are stored therein at given address positions under the control of address signals supplied from the address counter 154. After the color signals of one frame have been stored in the frame memories 155R, 155G and 155B, the color signals are simultaneously read out of the frame memories 155R, 155G and 155B under the control of a read out controller 156 to generate continuous R, G and B signals at a television rate. The read out color signals are supplied to output terminals 158R, 158G and 158B via buffer registers 157R, 157G and 157B, respectively.

Figure 8:
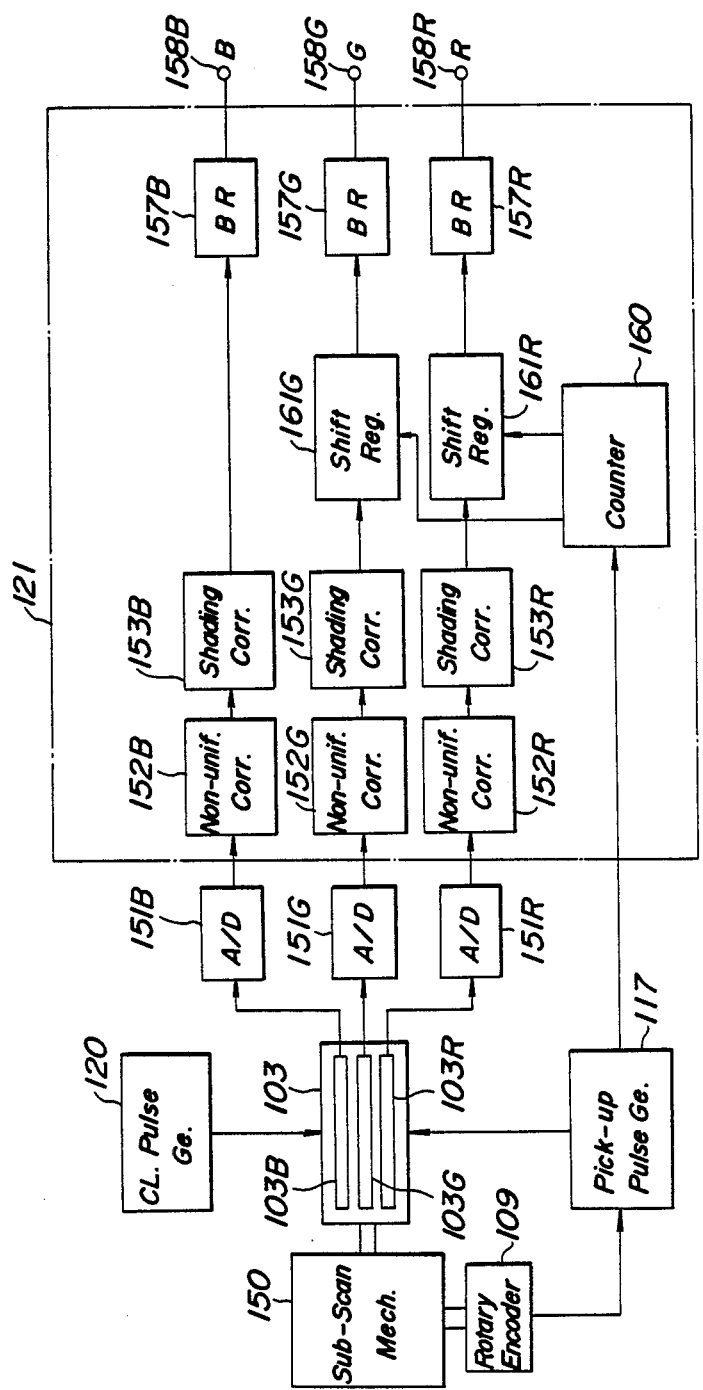
FIG. 8 is a block diagram depicting another embodiment of the signal processing circuit.
Figure 9:
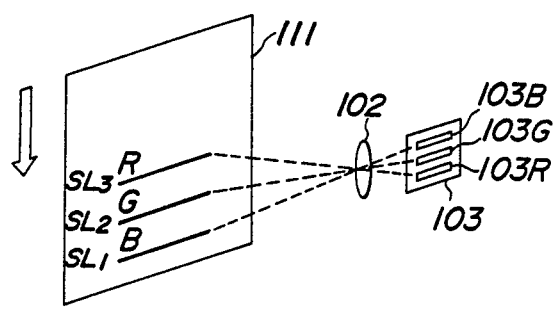
FIGS. 9 and 10 are schematic views for explaining the operation of the circuit of FIG. 8.
Figure 10:
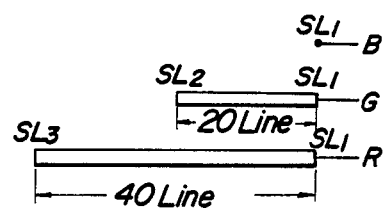

FIG. 8 is a block diagram showing another embodiment of the signal processing circuit 121. In this embodiment, portions simular to those shown in FIG. 7 are denoted by the same reference numerals used in FIG. 7 and explanation thereof is omitted. In the present embodiment, the signal processing circuit 121 comprises a counter 160 for counting the pick-up pulses supplied from the pick-up pulse generator 117 and count values of the counter 160 are used to control shift registers 161R and 161G for delaying the R and G color signals supplied from the line sensors 103R and 103G. FIG. 9 is a schematic view showing a positional relation between the line sensors 103R, 103G and 103B and picked up positions of the object 111. The R, G and B line sensors 103R, 103G and 103B are arranged in this order viewing from the bottom, but the picked up positions are reversed due to the objective lens 102. Now, it is assumed that when the solid state image sensor 103 is moved downward as shown by the arrow, and the picked up position is moved upward. FIG. 10 is a chart showing the timing relation among the R, G and B color signals. When the R line sensor 103R scans a position $SL_1$ on the object 111, picked up positions of the G and B line sensors 103G and 103B are outside the object 111. The R color signal from the line sensor 103R is successively stored in the shift register 161R. The line sensors 103R, 103G and 103B are separated in the sub-scanning direction by twenty scanning lines, i.e. $13 \times 20 = 260$ μm. After the R color signal of twenty scanning lines has been stored in the shift register 161R, the G line sensor 103G begins to pick up the position SL$_1$. At this time, the R line sensor 103R scans the position SL$_2$. After the R signals of forty scanning lines and the G signal of twenty lines have been stored in the shift registers 161R and 161G, respectively, the B line sensor 103B beings to scan the position SL$_1$. At this moment, the counter 160 supplies output pulses to the shift registers 161R and 161G to read out the R and G color signals. Then, the R, G and B color signals at the scanning position SL$_1$ are simultaneously supplied to output terminals 158R, 158G and 158B, respectively. In the present embodiment, the three line sensors 103R, 103G and 103B are separated by a distance equal to twenty times of the line spacing. In general, when the successive line sensors 103R, 103G and 103B are separated by N times of the line spacing, the values of 20 and 40 should be replaced by N and 2N, respectively. Further, if the solid state image sensor 103 is moved in the opposite direction to that explained above, the shift register 161R has to be connected in the signal line for processing the B color signal supplied from the B line sensor 103B.

Figure 11:
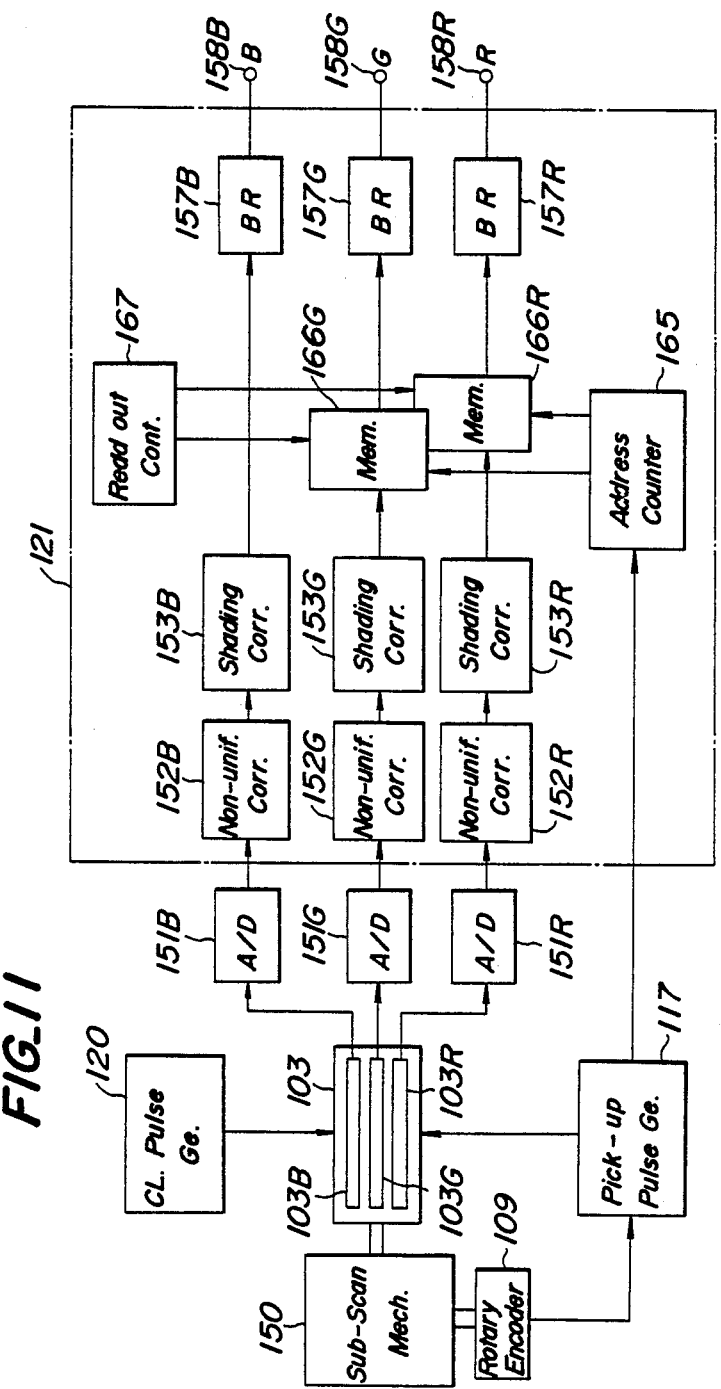
FIG. 11 is a block diagram illustrating another embodiment of the signal processing circuit.

FIG. 11 illustrates another embodiment of the signal processing circuit 121 which produces the one frame color signals having the identical timing. In this embodiment, the pick-up pulses are counted by an address counter 165 and the R and G color signals are stored in memories 166R and 166G under the control of address signals supplied from the address counter 165. The memories 166R and 166G have capacities of 40 and 20 lines, respectively. When the B color signal is supplied from the shading correction circuits 153B, the R and G color signals are simultaneously read out of the memories 166R and 166G, respectively, under the control of a read out controller 167. In this manner, the three primary color signals of the same timing can be supplied to the output terminals 158R, 158G and 158B, respectively. Also in this embodiment, when the solid state image sensor 103 is moved in the opposite direction, the memory 166R has to be connected in the blue signal processing line.

FIG. 12 is a block diagram illustrating still another embodiment of the signal processing circuit 121 according to the invention. In this embodiment, the color signals supplied from the line sensors 103R, 103G and 103B have relatively shifted timings. There is provided a counter 171 for counting the pick-up pulses and a count value No of the counter is compared with reference values N$_1$ and N$_2$, from a reference value generator 172, in comparators 173 and 174, respectively. As shown in FIG. 13, when the R line sensor 103R picks up the position SL$_1$, a start pulse is supplied to the counter 171 to start the counting operation. The reference values N$_1$ and N$_2$ correspond to the number of scanning lines between the R line sensor 103R and B line sensor 103G, and the number of scanning lines between the G line sensor 103G and B line sensor 103B, respectively. The first comparator 173 does not produce an output in the case of N$_0$<N$_1$, but generates an output if N$_0 \geq$ N$_1$. The second comparator 174 does not produce an output when N$_0$<N$_2$, but produces an output if N$_0 \geq$ N$_2$. The R, G and B color signals are supplied to buffer registers 175R, 175G and 175B and the latter two registers 175G and 175B are controlled by the outputs from the comparators 173 and 174, respectively, to produce output color signals. Therefore, after the R line sensor 103R has scanned the position SL$_1$, when the G line sensor 103G scans the same position SL$_1$ after the N$_1$ line period has elapsed, the buffer register 175G begins to derive the G color signal. Further, after the elapse of N$_2$ lines, the B line sensor 103B scans the same position SL$_1$, the buffer register 175B starts to generate the B color signal. These color signals are supplied to output terminals 158R, 158G and 158B via a three-line buffer register 176. In this manner, the G and B color signals are delayed with respect to the R color signal by N$_1$ and N$_2$ lines, respectively. The color signals thus generated at the output terminals 158R, 158G and 185B can be transmitted to a receiver in which the deviation of timings of the signals can be corrected by using a shift register or memory to obtain color signals having the identical timing, if necessary. Then, in the receiver, a color image may be displayed correctly. If the object is scanned in the opposite direction, it is sufficient to supply the output from the second comparator 174 to the buffer register 175R. Further, the writing-in and reading-out time period can be shortened, if a plurality of buffer registers 175R, 175G and 175B are used as a pipe line system. Moreover, when the buffer register 176 transmits simultaneously the R, G and B signals parallelly and each signal requires 8 bits, the buffer register 176 requires 24 bits totally. However, during a time period in which the next data is written in the buffer registers 175R, 175G and 175B, if the buffer register 176 sends data of three lines serially, a transmission line of 8 bits is sufficient.

In the above embodiment, since the two dimensional color pick-up apparatus needs not have a shift register or memory, its construction becomes simpler. Further, the pick-up apparatus can be advantageously combined with a receiver which can treat the color signals having shifted timings as they are. A color laser recorder in which a color image is recorded on color film with the aid of three color laser beams modulated by the received color signals having shifted timings is such a receiver.

In the embodiments so far explained, the solid state image sensor having three line sensors is mechanically moved to effect the sub-scanning. However, according to the invention the image sensor may be stationary and the object to be picked up may be moved in the sub-scanning direction. In such a case, a rotary encoder may be coupled with a driving mechanism for moving the object in the sub-scanning direction to produce the pick-up pulses and color signals derived from the R, G and B line sensors may be processed in a similar manner to that explained above.

FIG. 14 shows an embodiment of the pick-up apparatus according to the invention, in which an object 181 is moved in the sub-scanning direction by a driving mechanism 180 with respect to a stationary image sensor 103 having three line sensors 103R, 103G and 103B. A rotary encoder 183 is coupled with a driving shaft 182 of the driving mechanism 180. Output pulses from the rotary encoder 183 are supplied to a pick-up pulse generator 117 to produce pick-up pulses which are then supplied to a solid state image sensor 103 including line sensors 103R, 103G and 103B and to a signal processing circuit 121. R, G and B color signals derived from the line sensors 103R, 103G and 103B are also supplied to the signal processing circuit 121. As the signal processing circuit 121, use may be made of any one of the circuits 121 shown in FIGS. 7, 8, 11 and 12, and in the present embodiment the signal processing circuit illustrated in FIG. 7 is used. In the present embodiment, the frame or scanning region on the object 181 is enlarged as compared with the frame formed by a lens 102 on the solid state image sensor 103, and thus the accuracy of the driving mechanism 180 may be less strict and the driving mechanism can be made using inexpensive parts.

Figure 15:
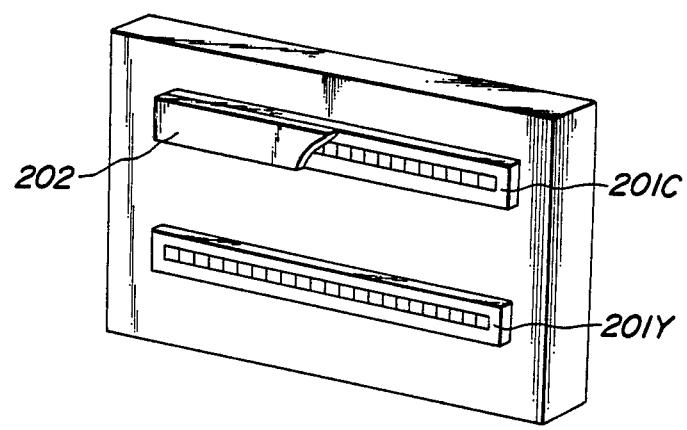
FIG. 15 is a perspective view illustrating another embodiment of the image sensor according to the invention.
Figure 16:
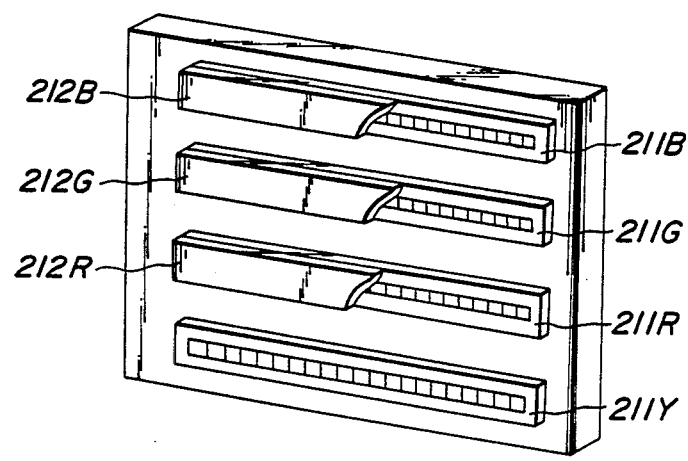
FIG. 16 is a perspective view depicting still another embodiment of the image sensor according to the invention.

The present invention is not limited to the embodiments explained above, but many modifications and alternations can be conceived by those skilled in the art within the scope of the invention. For instance, the solid state image sensor may comprise two or four line sensors. If the solid state image sensor comprises two line sensors as illustrated in FIG. 15, a first line sensor 201Y is used to derive a luminance signal and a color mosaic filter 202 is provided on a second line sensor 201C. Further, in the case of using four line sensors as shown in FIG. 16, red, green and blue color filters 212R, 212G and 212B are arranged on first, second and third line sensors 211R, 211G and 211B, respectively, and a fourth line sensor 211Y is used to derive a luminance signal. When there is provided a line sensor for deriving a luminance signal, it is possible to obtain a luminance signal having a higher resolution than that composed from the color signals. Moreover, the frequency band width of the color signals may be smaller than that of the luminance signal, and the circuit processing the color signals may be simplified. For instance the capacity of memories for storing the color signals may be smaller than that for storing the luminance signal.

What is claimed is:

1. A two-dimensional color image pickup apparatus comprising:
    a camera head including an optical means for forming an image of an object to be picked up on an imaging plane, a solid-state image sensing means for generating red, green, and blue color signals, said solid-state image sensing means including three line sensors which are arranged in said imaging plane, each of said line sensors having a number of image sensing elements arranged side by side in a main scanning direction with a given pitch, said line sensors being arranged parallel to each other and being separated from each other by given distances in a sub-scanning direction that is perpendicular to said main scanning direction, and red, green, and blue color filters, each of said color filters being arranged on a respective one of said line sensors;
    a mechanical sub-scanning means for causing a relative movement between said object and said solid-state image sensing means in said sub-scanning direction to effect a sub-scanning operation;
    a pickup pulse generating means coupled to said mechanical sub-scanning means for producing pickup pulses every time said object and said solid-state image sensing means are relatively moved by a distance corresponding to said given pitch;
    a controlling means for controlling said line sensors to initiate a line scanning operation in the main scanning direction in response to said pickup pulses; and
    a signal processing means, connected to said line sensors and said pickup pulse generating means, for compensating for said given distances which separate said line sensors so that the color signals corresponding to a point on the object are available simultaneously, said signal processing means including a plurality of buffer registers, each receiving one of the red, green, and blue color signals, a counter for counting the pickup pulses, a reference value generator for producing first and second reference values related to said given distances which separate said line sensors, and first and second comparators for comparing a count value of the counter with the first and second reference values, respectively, to produce output control signals that are supplied to at least two of the buffer registers.

2. An apparatus according to claim 1, wherein said signal processing means further comprises a non-uniformity correction circuit means for correcting for variations in the characteristics of the image sensing elements of the line sensors.

3. An apparatus according to claim 1, wherein said signal processing means further comprises a shading correction circuit means for correcting for uneven light intensity at said imaging plane due to the optical means.

4. An apparatus according to claim 1, further comprising a document table having a transparent glass plate on which the object is to be placed, a first illuminating means arranged underneath the glass plate for illuminating a transparent object and a second illuminating means arranged above the glass plate for illuminating an opaque object.

5. An apparatus according to claim 4, further comprising an up and down driving mechanism for adjusting the distance between the object and the camera head.

6. An apparatus according to claim 5, further comprising an automatic control means for controlling automatically said up and down driving mechanism in accordance with a desired magnification of the optical means.

7. An apparatus according to claim 1, wherein said mechanical sub-scanning means comprises a driving mechanism for moving the solid-state image sensing means in the sub-scanning direction.

8. An apparatus according to claim 1, wherein said mechanical sub-scanning means comprises a driving mechanism for moving the object in the sub-scanning direction.

9. An apparatus according to claim 1, wherein said solid-state image sensing means further comprises a fourth line sensor for generating a luminance signal.

* * * * *